United States Patent
Nissan

(10) Patent No.: US 9,905,224 B2
(45) Date of Patent: Feb. 27, 2018

(54) SYSTEM AND METHOD FOR AUTOMATIC LANGUAGE MODEL GENERATION

(71) Applicant: NICE-SYSTEMS LTD., Ra'anana (IL)

(72) Inventor: Maor Nissan, Herzliya (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 14/736,277

(22) Filed: Jun. 11, 2015

(65) Prior Publication Data

US 2016/0365090 A1 Dec. 15, 2016

(51) Int. Cl.
*G10L 15/19* (2013.01)
*G10L 15/26* (2006.01)
*G10L 15/187* (2013.01)

(52) U.S. Cl.
CPC ............ *G10L 15/19* (2013.01); *G10L 15/187* (2013.01)

(58) Field of Classification Search
CPC ........... G10L 15/265; G10L 2015/0635; G10L 2015/0633
See application file for complete search history.

(56) References Cited

U.S. PATENT DOCUMENTS

| | | | |
|---|---|---|---|
| 7,533,019 B1 | 5/2009 | Hakkani-Tiir et al. | |
| 7,860,716 B2 | 12/2010 | Tian et al. | |
| 8,554,703 B1 * | 10/2013 | Lin | G06N 99/005 706/12 |
| 8,818,808 B2 | 8/2014 | Hakkani-Tur et al. | |
| 2006/0041427 A1 * | 2/2006 | Yegnanarayanan | G10L 15/063 704/235 |
| 2006/0074656 A1 * | 4/2006 | Mathias | G10L 15/063 704/243 |
| 2008/0270133 A1 * | 10/2008 | Tian | G10L 15/01 704/251 |
| 2010/0030578 A1 * | 2/2010 | Siddique | G06Q 10/0637 705/3 |
| 2013/0262110 A1 | 10/2013 | Xie et al. | |
| 2013/0346077 A1 * | 12/2013 | Mengibar | G10L 15/265 704/235 |
| 2015/0019200 A1 * | 1/2015 | Woodward | G06F 17/2836 704/2 |
| 2015/0235637 A1 * | 8/2015 | Casado | G10L 15/222 704/235 |
| 2015/0254233 A1 | 9/2015 | Artzi et al. | |
| 2015/0278192 A1 | 10/2015 | Bretter et al. | |

(Continued)

OTHER PUBLICATIONS

Rabiner, Lawrence "A tutorial on hidden Markov models and selected applications in speech recognition." Proceedings of the IEEE 77.2 (1989): 257-286.

(Continued)

*Primary Examiner* — Qian Yang
(74) *Attorney, Agent, or Firm* — Pearl Cohen Zedek Latzer Baratz LLP

(57) ABSTRACT

A computer-implemented method of generating a language model. An embodiment of a system and method may include selecting a set of words from a transcription of an audio input, the transcription produced by a current language model. The set of words may be used to obtain a set of content objects. The set of content objects may be used to generate a new language model. The current language model may be replaced by the new language model.

10 Claims, 4 Drawing Sheets

(56) References Cited

U.S. PATENT DOCUMENTS

2015/0340024 A1* 11/2015 Schogol .................. G10L 15/26
704/235
2015/0370784 A1    12/2015 Nissan et al.
2016/0093294 A1*  3/2016 Kapralova ............ G10L 15/063
704/232

OTHER PUBLICATIONS

Chen Stanley et al. "An empirical study of smoothing techniques for language modeling." Computer Speech & Language 13.4 (1999): 359-393.
Dan Jurafsky et al. "Speech and Language Processing: An Introduction to Natural Language Processing, Computational Linguistics, and Speech Recognition" N-grams chapter 6 (pp. 189-232).
Strope B. et al. "Unsupervised Testing Strategies for ASR" Interspeech (pp. 1685-1688).
"Deterministic acyclic finite state automaton" Downloaded from Wikipedia; last modified on Oct. 29, 2015.

* cited by examiner

WORD ASR OUTPUT

| START TIME | DURATION | WORD | PROB | WORD | PROB | WORD | PROB |
|---|---|---|---|---|---|---|---|
| 0.75 | 0.83 | ~SIL | 99.80% | </S> | 0.20% | | |
| 1.58 | 0.2 | THEY | 66.60% | THINK | 31.10% | I | 1.10% |
| 1.78 | 0.11 | COULD | 66.60% | IF | 15.30% | IT | 14.70% |
| 1.89 | 0.11 | BUT | 61.50% | IT | 19.00% | WOULD | 11.90% |
| 2 | 0.27 | DIDN'T | 99.00% | COULDN'T | 1.00% | | |

SUB-WORD ASR OUTPUT

| START TIME | DURATION | WORD | PROB | WORD | PROB | WORD | PROB |
|---|---|---|---|---|---|---|---|
| 0.75 | 0.83 | ~SIL | 99.80% | </S> | 0.20% | | |
| 1.58 | 0.2 | TH | 66.60% | EH | 31.10% | IH | 1.10% |
| 1.78 | 0.11 | B | 66.60% | AH | 15.30% | IT | 14.70% |
| 1.89 | 0.11 | EY | 61.50% | OW | 19.00% | D | 11.90% |
| 2 | 0.27 | M | 99.00% | P | 1.00% | | |

*FIG. 4*

SYSTEM AND METHOD FOR AUTOMATIC LANGUAGE MODEL GENERATION

FIELD OF THE INVENTION

The present invention relates generally to converting audio content into text. More specifically, the present invention relates to automatic generation of a language model usable in speech to text (STT) systems and methods.

BACKGROUND

Speech to text (STT) systems and methods that produce text output or transcription based on audio input are known in the art. To convert speech to text, STT systems use language models. A language model is created or improved by a process known in the art as training. Generally, training includes assigning (and recording in a language model) probabilities or other values to words or phrases identified in input text or training material. However, since the training material is often very different from the actual input provided to an STT system in operation, known STT systems and methods may often produce poor transcriptions of input audio input.

SUMMARY

An embodiment of a system and method may include selecting a set of words from a transcription of an audio input, the transcription produced by a current language model. The selected set of words may be used to obtain a set of content objects. The set of content objects may be used to generate a new language model. The current language model may be replaced by the new language model. Words included in the transcription may be associated with probabilities and a selected set of words may be selected based on their respective probabilities. Selected words may be used for obtaining or searching for content objects and the content objects may be used for training a new language model. Using unsupervised testing, a performance of the new language model may be compared to a performance of the current language model and, if the performance of the new language model is better than that of the current language model, the current language model may be replaced by the new language model.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 4 shows exemplary outputs of units according to embodiments of the present invention;

Figure 1:
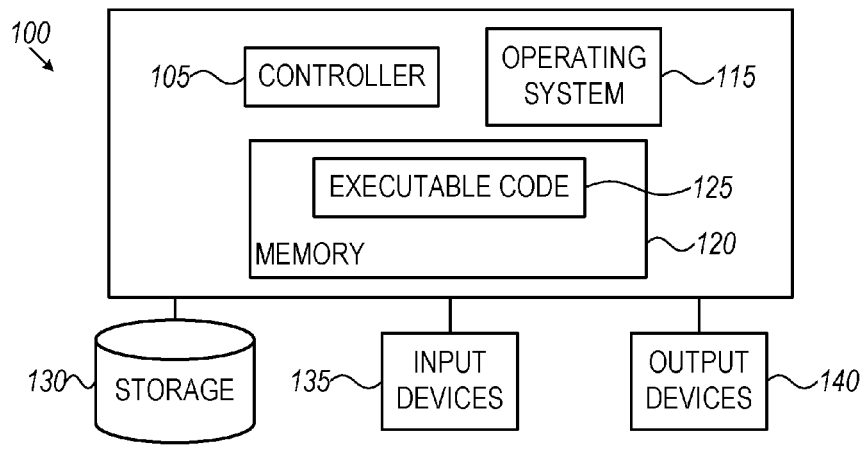
FIG. 1 shows high level block diagram of an exemplary computing device according to embodiments of the present invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term "transcription" as referred to herein may be or may include a textual representation of audio content. For example, a transcription of a call may be or may include a file (that may be stored on a server or sent over a computer network) where the file includes text spoken in the call. An indexed transcription or a structured data object generated by indexing a transcription may be a vector or other construct that includes one or more words and/or phrases and one or more probabilities, ranks or scores associated with words or phrases. For example, an indexed transcription may include a selected set of words and may further include, for each word, a probability value, a rank or score. For example, a transcription may be the output of a language model as known in the art.

Language models are known in the art. Generally, a statistical language model assigns probability values (or ranks or scores) to words or phrases and probability value assigned to a word or phrase is a measure of the likelihood that the word or phrase is a legitimate word or phrase.

Decoding audio content (e.g., using a large language model, a dictionary or a language specific model) may include analyzing the audio content and producing textual data based on the analyzed audio content. For example, decoding a recording of a call or conversation may produce a transcription. Matching an indexed transcription with a plurality or set of language models may be done by an embodiment of a system or method according to the invention using the probability values, a ranks or scores in the indexed transcription.

As known in the art, STT systems or engines use language models. A language model is trained or created based on provided text or transcript. Therefore, the quality of a language model is a function of the text used for creating or training the language model. For example, a language model may be generated, created or trained, based on text in a website, a social network, a forum or a transcription of a book. However, as the language in a social network or forum changes, e.g., new slang appears or new topics related to new fields of interest are discussed, the quality of a language model may degrade since it may fail to correctly identify or score new words and phrases. Moreover, a language model created or trained based on a first vocabulary may perform poorly when provided with text that include a different, second vocabulary.

A system and method according to embodiments of the invention may receive as input textual content such as a transcript or it may receive audio content as input and convert the input audio content into a transcript or text. A system and method according to embodiments of the invention may identify elements or features such as words or phrases in input text and use the identified elements or features to search for relevant material usable for training a language model.

As known in the art, a language model assigns, or is used to assign, probabilities to features (e.g., phrases, combination of words etc.) in input text. A system and method according to embodiments of the invention may examine scores, indices or probabilities of features in input text (e.g., as determined using a language model), select some of the features based on their scores or probabilities and use the selected features to search for additional text. Additional text identified, found or obtained may be used for additional training of the language model.

A method of identifying features in input text and searching for additional text to be used for training may be repeated any number of times. For example, a system and method according to embodiments of the invention may periodically, continuously or endlessly train and re-train a language model. For example, using text exchanged by users of a social network, a system and method according to embodiments of the invention may continuously train a language model such that it evolves as the language in the social network evolves. It will be noted that a system and method according to embodiments of the invention may automatically or autonomously learn a language or train a language model, without any intervention or effort by a human.

Reference is made to FIG. 1, showing a high level block diagram of an exemplary computing device 100 according to embodiments of the present invention. Computing device 100 may include a controller 105 that may be, for example, a central processing unit processor (CPU), a chip or any suitable computing or computational device, an operating system 115, a memory 120, an executable code 125, a storage 130, input devices 135 and output devices 140. Controller 105 may be configured to carry out methods described herein, and/or to execute or act as the various modules, units, etc. More than one computing device 100 may be included, and one or more computing devices 100 may act as the various components, for example the components shown in FIG. 2. For example filtering unit 230 described herein may be, or may include components of, computing device 100. For example, by executing executable code 125 stored in memory 120, controller 105 may be configured to carry out a method of generating a language model as described herein. For example, each of speech engine 215, filtering unit 230, language model generation unit 240 and adaptation unit 260 (all of which further described herein) may be, or may include, a controller 105, a memory 120 and executable code 125, accordingly, a controller 105 may execute the functionalities of modules or units in a system, e.g., modules or units included in system 200 described herein with reference to FIG. 2. For example, controller 105 may be configured to produce a transcription based on an input audio object, recording or stream, associate words in the transcription with probabilities, select at least some of the words in the transcription based on their associated probabilities, use the selected words to search for or obtain additional input, the additional input may be a set of textual or audio content objects and use the additional input to train or generate a new language model as described herein. Content objects, training material and/or additional input as described herein may include any objects usable in order to train a language model as known in the art. For example, a set of textual or audio content objects found and/or obtained using words in a transcription as described herein may be webpages, text posted in a social network, articles published on the internet and/or textual documents (e.g., documents created using a word processing program such as Word provided by Microsoft or Acrobat provided by Adobe).

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that generates or trains a speech engine as further described herein. Although, for the sake of clarity, a single item of executable code 125 is shown in FIG. 1, a system according to embodiments of the invention may include a plurality of executable code segments similar to executable code 125 that may be loaded into memory 120 and cause controller 105 to carry out methods described herein. For example, units or modules described herein (e.g., filtering unit 230, adaptation unit 260 and language model generation unit 240) may be, or may include, controller 105, memory 120 and executable code 125.

Storage 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

Some embodiments may be provided in a computer program product that may include a non-transitory machine-readable medium, stored thereon instructions, which may be used to program a computer, controller, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

Where applicable, units such as filtering unit 230, adaptation unit 260 and language model generation unit 240, and other components and units described herein, may be similar to, or may include components of, device 100 described herein. For example, filtering unit 230, adaptation unit 260 and language model generation unit 240 may be or may include a controller 105, memory 120 and executable code 125. For example, units shown in FIG. 2 and elsewhere may be tasks or applications executed by controller 105.

Figure 2:
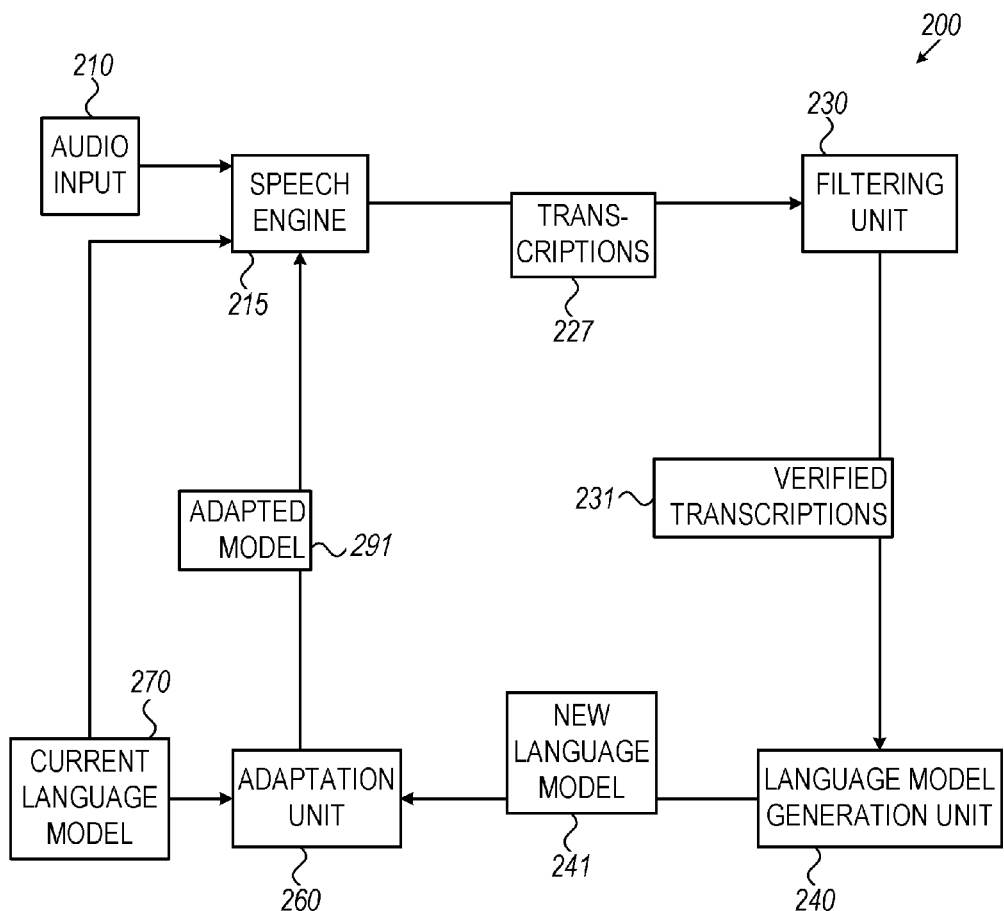
FIG. 2 is an overview of a system according to embodiments of the present invention.

Reference is made to FIG. 2, an overview of a system 200 and flows according to embodiments of the present invention. As shown, audio input 210 may be provided to an embodiment of a system or method. Audio input 210 may be any audio content as known in the art, e.g., a recording of a conversation, a recording of spoken words or a synthesized audio content, e.g., generated by a computer or machine. As shown, system 200 may include a speech engine 215, a filtering unit 230, a language model generation unit 240 and an adaptation unit 260. Each of speech engine 215, filtering unit 230 language model generation unit 240 and adaptation unit 260 may be, or may be executed by, a controller, e.g., controller 105 shown in FIG. 1 and described herein.

According to embodiments of the invention, input audio 210 may be decoded by speech (or STT) engine 215. For example, input audio 210 may be a recording of audio signal as known in the art. STT engines or speech engines are known in the art. Generally, a speech or STT engine receives audio content (e.g., recording of a human voice) as input and produces a transcription of the audio input. Output of an STT engine may be in the form of a transcription and/or a phonetic lattice. A phonetic lattice is known in the art. A phonetic lattice may be a directed acyclic graph (e.g., as described in http://en.wikipedia.org/wiki/Deterministic_acyclic_finite_state_automaton) which represents, records and/or provides the probability of each phoneme to be output at a certain time. Description of an STT engine may be found, for example, in http://people.sabanciuniv.edu/~berrin/cs512/reading/rabiner-tutorial-on-hmm.pdf.
Transcriptions 227 may be, or may include, one or more phonetic lattices. The terms "transcription" and "phonetic lattice" as referred to herein may mean, or refer to, the same thing or entity and may be used interchangeably herein.

Filtering unit 230 may receive transcriptions 227 as input and produce verified transcriptions 231 as output. Filtering unit 230 may select a set of words from transcriptions 227 and include the selected set of words in verified transcription 231. Filtering unit 230 may include two models, a word automatic speech recognition (ASR) model that may extract words from input transcriptions and a sub-word ASR model. ASR models are known in the art. Generally, provided with input, an ASR model outputs a sequence of symbols and quantities, e.g., in the form of a phonetic lattice as described herein. As known in the art, an ASR model may be created or trained for, or based on, a specific or selected set of words. For example, a word dictionary may be used to train the word ASR model and a sub-words dictionary may be used to train or generate the sub-word ASR model, e.g., as known in the art.

For example, using the word ASR model, filtering unit 230 may extract or select words (e.g., a lattice of words) from transcriptions 227. For example, selecting a set of words may be based on the probabilities of words included in transcriptions 227. Using a sub-word ASR model, filtering unit 230 may extract a lattice of sub-words from transcriptions 227. Filtering unit 230 may combine or merge two lattices into one lattice. For example, a lattice or list of words and a lattice or list of sub-words may be combined into one list or lattice of words. Accordingly, filtering unit 230 may select a set of words from a transcription of an audio input, the transcription produced by a current language model. For example, filtering unit 230 may select a set of words from transcriptions 227 that may be a transcription of audio input 210 produced by speech engine 215 using current language model 270. The set of selected words may be included in verified transcriptions 231. Verified transcriptions 231 may be used to generate a new language model (e.g., new language model 241) based on the content objects. For example, words selected from transcriptions 227 and included in verified transcriptions 231 may be used to search for content objects and the content objects may be used for training or creating new language model 241.

For example, filtering unit 230 may examine all words (and their associated probability or certainty values) in a lattice extracted from transcriptions 227 by a word ASR, select the words associated with certainty or probability value that is greater than threshold θ and insert the selected words into a combined list or lattice.

With respect to sections, parts or portions of an input transcription where words cannot be identified with a given confidence or probability level (e.g., only words or phrases associated with a certainty value that is less than θ), filtering unit 230 may utilize sub-words.

For example, in some areas of transcriptions 227, where identified sub-words certainty is greater than a second threshold (e.g., α), if a set of sub words sums up to, or can be used to produce, a word included in a word dictionary, the word produced based on the sub-words may be included in a combined list or lattice. For example, if the set of sub-words "_N", "_IY" and "_T" is detected then the word "NEAT" may be deduced and/or produced based on the set of sub-words and the word "NEAT" may be inserted into the combined list. A certainty or probability of a set of sub-words may be identified or determined as described herein, e.g., with respect to an output of an acoustic decoder as described in http://en.wikipedia.org/wiki/Deterministic_a-cyclic_finite_state_automaton. Accordingly, sub-words in a transcription provided as input to filtering unit 230 may be assigned or associated with a certainty or probability value and areas in the transcription where the certainty or probability of a set of sub-words is higher than a threshold, e.g., α may be identified.

Figure 3:
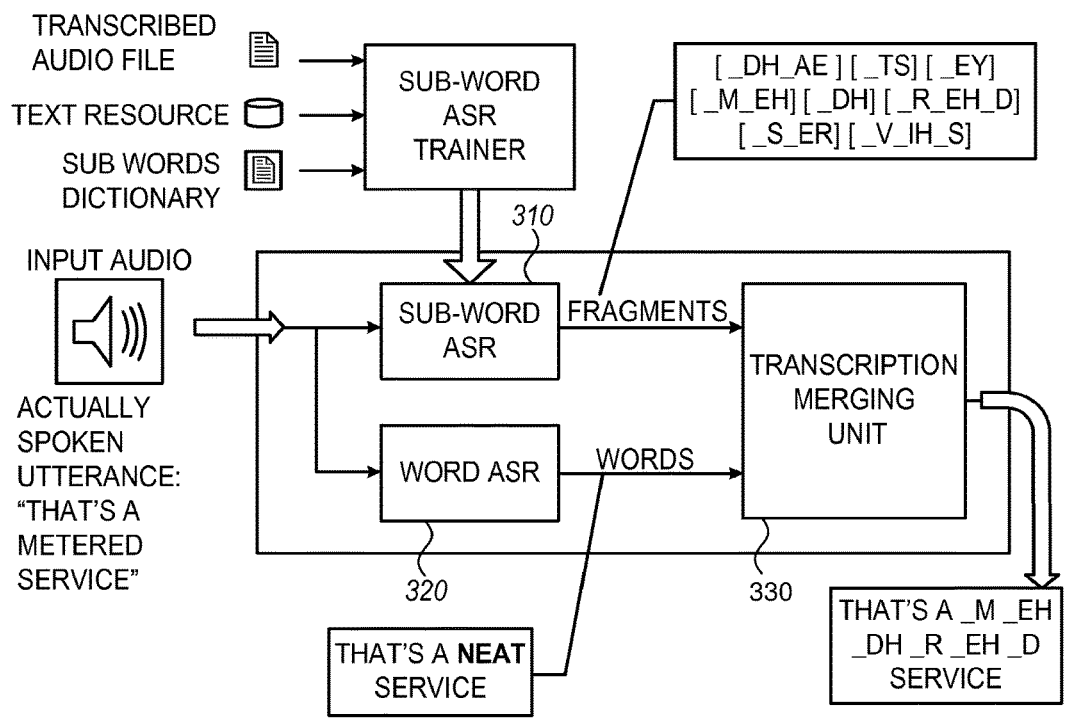
FIG. 3 is an overview of a filtering unit according to embodiments of the present invention.

Reference is additionally made to FIG. 3, showing components of filtering unit 230 according to embodiments of the present invention. As shown, a filtering unit may include a sub-words ASR 310, a words ASR 320 and a transcription merging unit 330. As shown, a sub-words ASR 310 may be trained by a sub-words ASR trainer that may use as input transcribed audio files (e.g., an audio file with matching text), text resource that may be used for learning the statistical structure of the sub-words sequences as known in the art and a sub-words dictionary. Training of sub-words ASR 310 may be as known in the art, e.g., as described in http://people.sabanciuniv.edu/~berrin/cs512/reading/rabiner-tutorial-on-hmm.pdf.

As shown, output from a sub-words ASR 310 and words ASR 320 may be merged by merging unit 330. For example and as shown, given an input of an actually spoken utterance "THAT'S A METERED SERVICE", words ASR 320 may ouptut the phrase "THAT'S A NEAT SERVICE" where the word "NEAT" may be associated with a low probability value. As shown, based on the same input, sub-words ASR 310 may identify or extract the combinations or sub-words [_DH_AE] [_TS] [_EY], [_M_EH] [_DH] [_R_EH_D] and [_S_ER] [_V_IH_S]. As further shown, merging unit 330 may combine outputs of ASR's 310 and 320 to produce "THAT'S A _M _EH _DH _R _EH _D SERVICE". Once the transcription merging unit has output the final transcription of words and sub-words, the sub-words sequences are checked versus known words (e.g., from a dictionary) and if a set or sequence of sub-words sums up to an existing word in the dictionary, the set or sequence of sub-words may be replaced by the word. For example, the sequence or set of sub-words "[_N ] [_IY] [_T]" may be identified, and replaced by, the word "NEAT" found in a dictionary. If a set or sequence of sub-words does not sum up to an existing word in the dictionary, the set or sequence of sub-words may be ignored.

Filtering unit 230 may assign words and sub-words with probabilities, ranks or scores. For example, filtering unit 230 may examine all words (and their associated probability or certainty values) in a lattice extracted from transcriptions 227 by a word ASR, select the words associated with certainty or probability value that is greater than threshold θ and insert the selected words into a combined list.

With respect to sections, parts or portions of an input transcription where words cannot be identified with a given confidence or probability level (e.g., words or phrases associated with a certainty value that is less than θ), filtering unit 230 may utilize sub-words.

For example, in some areas of transcriptions 227, where identified sub-words certainty is greater than a second threshold (e.g., α), if a set of sub words sums up to, or can be used to produce, a word included in a word dictionary, the word produced based on the sub-words may be included in a combined list or lattice.

A certainty or probability of a set of sub-words may be identified or determined as described herein, e.g., with respect to an output of an acoustic decoder as for example described in http://en.wikipedia.org/wiki/Deterministic_a-cyclic_finite_state_automaton. Accordingly, sub-words in a transcription may be assigned or associated with a certainty or probability value and areas in the transcription where the certainty or probability of a set of sub-words is higher than a threshold, e.g., a may be identified.

Reference is additionally made to FIG. 4, showing an example of output of a word ASR (block 410) and an example of output a sub-word ASR (block 420) according to embodiments of the present invention. It is noted that the examples shown in FIG. 4 are limited to 2-Best, however, an N-Best output for any N may be produced by embodiments of the invention as known in the art. As known in the art, N-best is a search method or procedure that is guaranteed to find the N most likely whole sentence alternatives that are within a given beam of the most likely sentence, e.g., as further explained in http://ieeexplore.ieee.org/xpl/login.jsp?tp=&arnumber=115542&url=http%3A%2F%-2Fieeexploreleee.org%2Fie15%2F132%2F3385%2F00115-542.pdf%3Farnumber%3D115542.

Verified transcriptions 231 may be a phoneme lattice or other list that includes words for which the probability or confidence level is higher than a configured, pre-set or other threshold. For example, only words identified in transcriptions 227 and associated with a probability higher than 0.95 (in a range of 0 . . . 1) may be included in verified transcriptions 231. Accordingly, verified transcriptions 231 may be a list or other structured data object that includes words identified in transcriptions 227 with a high certainty level.

Language model generation unit 240 may create or generate a language model based on verified transcriptions 231 and based on other sources. For example, language generation unit 240 may extract a word, a set of words, a phrase or other element from verified transcriptions 231 and use the extracted element to search a database or network, for example, the internet for documents or textual objects that contain the extracted element. Language generation unit 240 may search a database or other storage system for documents or textual objects that contain a word or element found in verified transcriptions 231. Textual content found or identified using elements in verified transcriptions 231 as described may be used in order to generate or create new language model 241.

According to embodiments of the invention, documents found on the internet or in a database using a word, feature or element extracted from verified transcriptions 231 as a search key or search expression may be provided as input, or training material, to a language model generation process, e.g., a process carried out by language generation unit 240 as described herein.

Creating a language model based on input text is known in the art. For example, language generation unit 240 may create or generate new language model 241 using input text in content objects such as documents, webpages or other relevant material found as described herein and further using a smoothing method as described by Chen, Stanley F., and Joshua Goodman. "An empirical study of smoothing techniques for language modeling." Computer Speech & Language 13.4 (1999): 359-393. (http://u.cs.biu.ac.il/~yogo/courses/mt2013/papers/chen-goodman-99.pdf).

As shown in FIG. 2, new language model 241 and a current language model 270 may be provided as input to adaptation unit 260. Adaptation unit 260 may perform an adaptation of current language model 270 to produce adapted language model 291. As further shown, adapted language model 291 may be provided to speech engine 215 that may use adapted language model 291 for decoding audio content as described. For example, adaptation unit 260 may replace current language model 270 (or other language model currently used be speech engine 215) with adapted language model 291. Replacing current language model 270 with, or by, adapted language model 291 may include configuring speech engine 215 to use adapted language model 291 instead of using current language model 270. The process of producing transcriptions 227, producing verified transcriptions 231, creating a new language model 241 and replacing a currently used language model by a new language model adapted to an environment, language or vocabulary may then be automatically repeated. Current language model 270 may be a model being used before being replaced by a different or new language model such as new language model 241.

Accordingly, system 200 may automatically train itself according to evolving conditions. For example, as described, system 200 may continuously train or adapt a language model used for decoding audio or other input such that the language model remains relevant and accurate as language, topics, slang or topics in its input change and/or evolve. For example, system 200 may continuously train or adapt a language model according to text in a web site, a social network, a professional forum and so on.

Adaptation unit 260 may create or generate adapted language model 291 using methods known in the art. For example, adaptation unit 260 may use methods known in the art such as linear interpolation, Maximum A-posteriori adaptation, class-based language model generation, Maximum-Entropy Modeling, Neural Networks and/or any combination thereof to create adapted language model 291 based on current language model 270 and new language model 241.

Adaptation unit 260 may be provided with an adaptation parameter $\pi$, if an adaptation of current language model 270 is less than, or below a configured level or threshold, the adaptation parameter $\pi$ may be automatically increased by adaptation unit 260 by a configured step or amount and an adaptation process may be repeated until a maximal adaptation is reached.

Adaptation unit 260 may perform unsupervised testing of adapted model 291 to validate that adapted model 291 better than the current language model 270. For example, randomly selected files may be used for testing adapted model 291. For example, unsupervised testing performed by adaptation unit 260 may be as described in "Strope, B., Beeferman, D., Gruenstein, A., & Lei, X. (2011), Unsupervised Testing Strategies for ASR. In *INTERSPEECH* (pp. 1685-1688).".

Adaptation unit 260 may calculate a relative accuracy for adapted model 291. For example, a relative accuracy may be calculated by comparing a word error rate of adapted model 291 to a word error rate of a reference language model and comparing a word error rate of current language model 270 to a word error rate of the reference language.

By comparing the word error rates of both adapted model 291 and current language model 270 to a word error rate of a reference language model, the relative accuracy of each of adapted model 291 and current language model 270 may be determined and thus adaptation unit 260 may determine whether or not adapted model 291 is better than current language model 270.

According to some embodiments of the invention, if, performing an unsupervised testing of adapted model 291 as described, adaptation unit 260 may determines that adapted model 291 is better than current language model 270 then adaptation unit 260 (or another component of system 200) may replace current language model 270 with adapted model 291 such that speech engine 215 uses adapted model 291 in order to decode subsequent input. For example, speech engine 215 may use current language model 270 during a first time period or phase and, upon determining that adapted model 291 is better than current language model 270, a system or method according to embodiments of the invention may configure (or re-configure) speech engine 215 to use adapted model 291 and not current language model 270, accordingly, current language model 270 may be replaced by adapted model 291.

For example, if adapted model 291 produces a lower word error rate than current language model 270 when decoding the same input, or adapted model 291 otherwise produces better results than current language model 270 then a system and method according to embodiments of the invention may replace current language model 270 by adapted model 291 and use adapted model 291 to decode input audio or input transcriptions.

According to some embodiments of the invention, using a first language model, a system and method may automatically generate a second language model, verify the second language model is better than the first language model and replace the first language model with the second language model. A process of generating a new language model, verifying the new language model is better than a current language model and replacing the current language model by the new language model may be repeated any number of times, e.g., periodically or continuously. Accordingly, some embodiments of a system and method may automatically, autonomously and/or continuously improve the language model used by the system or method.

Figure 5:
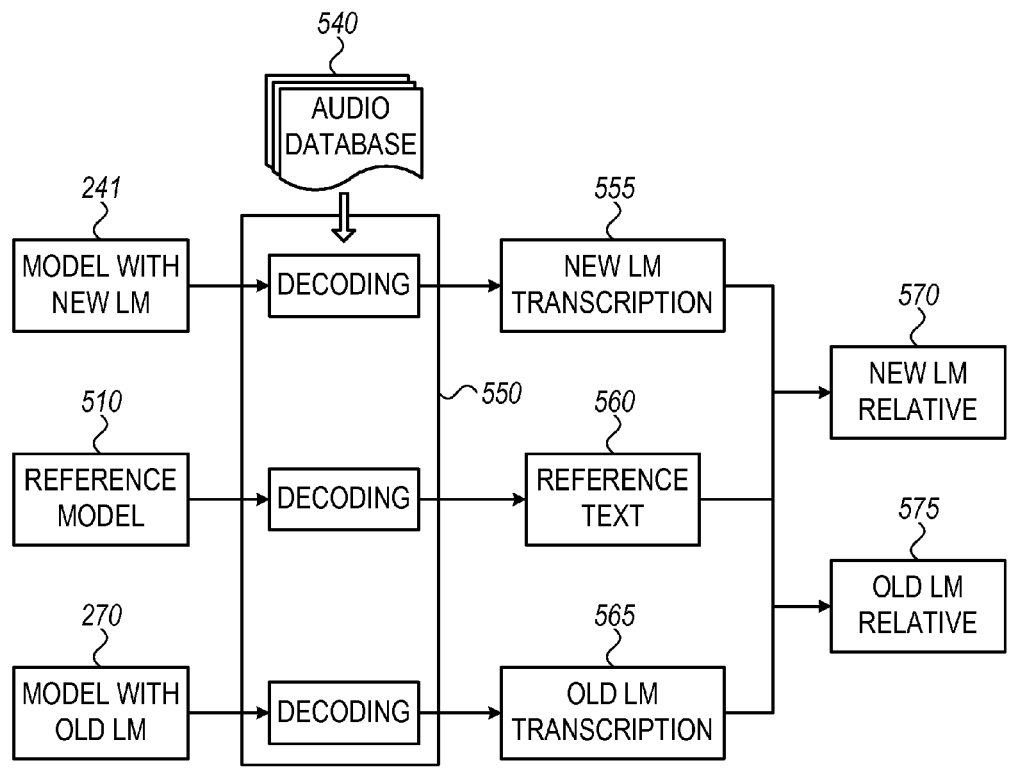
FIG. 5 shows a flowchart of a method according to an embodiment of the present invention.

Reference is made to FIG. 5 that shows a flowchart of a method and components according to an embodiment of the present invention. As shown by block 550, three language models may be used to decode audio input 540. For example, audio input 540 may be any audio content obtained from a database or any other suitable source.

As shown by block 550, the three language models used for decoding audio input 540 may be new language model 241, current language model 270 and a reference language model 510. Reference language model 510 may be any language model. As shown transcription 555 may be produced using language model 241, transcription 560 may be produced using reference language model 510 and transcription 565 may be produced using current language model 270.

As shown by block 570, a relative accuracy or relative word error rate (WER) may be calculated for new language model 241, e.g., by comparing or relating transcription 555 to transcription 560. As shown by block 575, a relative accuracy or WER may be calculated for current language model 270, e.g., by comparing or relating transcription 565 to transcription 560. If the relative accuracy or WER calculated for new language model 241 is higher or better that the relative accuracy or WER calculated for current language model 270 then an embodiment of a system or method may replace current language model 270 by new language model 241 as described.

For example, a system or method according to embodiments of the invention may combine a weak acoustic model with new language model 241 and current language model 270 to produce an STT model and use the STT model as shown by blocks 241 and 270 as described.

Acoustic models and their usage by acoustic decoders are known in the art. Generally, an acoustic model is used in ASR's to represent the relationship between an audio signal and the phonemes or other linguistic units that make up speech. Typically, an acoustic model is created based on a set of audio recordings and their corresponding transcripts. For example, software is used to create statistical representations of the sounds that make up each word in a recording.

As described, if new language model 241 is better than current language model 270 then current language model 270 may be replaced by new language model 241, e.g., system 200 may use new language model 241 (and not current language model 270) in order to decode audio or other input provided to system 200. If new language model 241 is not better than current language model 270, e.g., new language model 241 does not improve the recognition of (possibly new) words in audio input 540, then the adaptation factor π may be increased and the process of generating new language model 241 as described herein may be repeated using the increased adaptation factor.

If a maximal value of adaptation factor π is reached and new language model 241 is still not good enough (e.g., does not show improvement with respect to current language model 270 as described) the process of generating new language model 241 may be repeated or continued by obtaining additional content. For example, additional documents or textual objects that contain a word or element found in verified transcriptions 231 may be obtained from a database or the internet and used as described herein.

An exemplary unsupervised testing of an adapted model (e.g., testing of adapted model 291) may include the following operations:

Decoding a given speech by employing a baseline or current language model together with a provided suitable acoustic model by a speech decoding apparatus, thereby obtaining a 'baseline reference transcription'. For example, audio content 540 may be decoded by speech engine 215 using current language model 270 together with a suitable acoustic model to produce reference transcription 560 that may be used as the 'baseline reference transcription'.

Decoding a given speech by employing the baseline language model together with a provided 'weak' acoustic model by a speech decoding apparatus, thereby obtaining a 'weak baseline reference transcription' thereof. A 'weak' acoustic model refers to a model that has less predictive power than the baseline acoustic model. For example, audio content 540 may be decoded by speech engine 215 using current language model 270 together with a 'weak' acoustic model to produce old LM transcription 565 that may be used as the 'weak baseline reference transcription'.

Decoding a given speech by employing the adapted language model together with the provided 'weak' acoustic by a speech decoding apparatus, thereby obtaining a 'weak adapted transcription'. For example, audio content 540 may be decoded by speech engine 215 using new language model 241 together with a 'weak' acoustic model to produce new LM transcription 555 that may be used as the 'weak adapted transcription'.

An exemplary unsupervised testing of an adapted model may further include comparing the 'weak baseline reference transcription' to the 'baseline reference transcription', thereby obtaining a "baseline word error rate difference", comparing the 'weak adapted reference transcription' to the 'baseline reference transcription', thereby obtaining an 'adapted word error rate difference', and comparing the 'adapted word error rate difference' to the 'baseline word error rate difference'.

As described herein, if the 'adapted word error rate difference' is sufficiently lower than the 'baseline word error rate difference' then the adapted language model may be selected for subsequent decoding of input speech, otherwise the baseline or current language model may be selected for subsequent decoding of input speech. The sufficiently lower difference is determined, at least in some embodiment, by a threshold, e.g., π as described herein.

An embodiment of a system or method may continuously or periodically generate, adapt or train a language model as described herein. An embodiment of a system or method may continuously or periodically train or generate a new language model, perform unsupervised testing of the new language model and, based on the unsupervised testing, determine that the new language model is better than a current language model. If an embodiment of a system or method determines a new language model is better than a current language model, an embodiment of a system or method may automatically replace the current language model with the new one. Accordingly, a system and method according to embodiments of the invention may automatically and continuously improve the language model used by the system or method in an unsupervised manner.

For example, an embodiment of a system or method may continuously or periodically create a transcription using a current language model and, using the current language mode, assign probabilities to words in the transcription, e.g., generate transcriptions 227 and assign probabilities to words in transcriptions 227 as described.

Based on the probabilities, an embodiment may select a set of words from a transcription based on a respective set of probabilities associated with, or assigned to, the words in the transcription. For example, filtering unit 230 may select some of the words in transcriptions 227, e.g., words with a probability higher than 0.9 and include the selected words in verified transcriptions 231. An embodiment of a system or method may use the set of selected words to obtain or gather a set of content objects. For example, words in verified transcriptions 231 may be used (e.g., as search terms or search keys) in order to search the internet or search a database for content objects that include the words, which may be retrieved. Content objects found or identified using words selected from transcriptions 227 as described (e.g., words selected from transcriptions 227 based on their probabilities and included in verified transcriptions 231) may be downloaded and stored (e.g., in a storage 130 or a memory 120) and may be used as input to language model generation unit 240. For example, content objects found or identified using words selected from transcriptions 227 may be used, e.g., by language model generation unit 240, to train or create new language model 241 as known in the art.

Accordingly, textual or other content objects related to the words may be found and used to generate or train a new language model based. For example, if the words "medical equipment" are identified, with high confidence level or with high probability in transcriptions 227 then these words may be used to search the internet for webpages or documents that include the words "medical equipment". Using documents that include the words "medical equipment", a new language model may be trained, thus the new language model may be better adapted for decoding material or audio input related to medical equipment. A threshold may be used in order to decide whether or not to include a word or term in verified transcriptions 231. For example, only words in transcriptions 227 that are associated with a probability higher than a threshold of "0.86" may be included in verified transcriptions 231.

Unsupervised testing may include comparing performance of a current language model with performance of the new language model. For example, unsupervised testing as described with reference to FIG. 5 may be used. Generally, performance may be measured by a word error rate (WER). For example, a reference WER may be calculated by decoding an arbitrarily selected input using a reference language model. The WER's resulting from decoding the same input using the current and new language models may be compared to the reference WER to produce a relative WER. If the relative WER of the new language model is lower than the relative WER of the current language model than it may be assumed that the new language model (or performance of the new language model) is better than the current one (or the performance of the current language model) and the current language model may be replaced by the new language model, effectively, the new language model may become the current language model, e.g., the new language model becomes the language model used by an embodiment of a system or method for decoding input.

Figure 6:
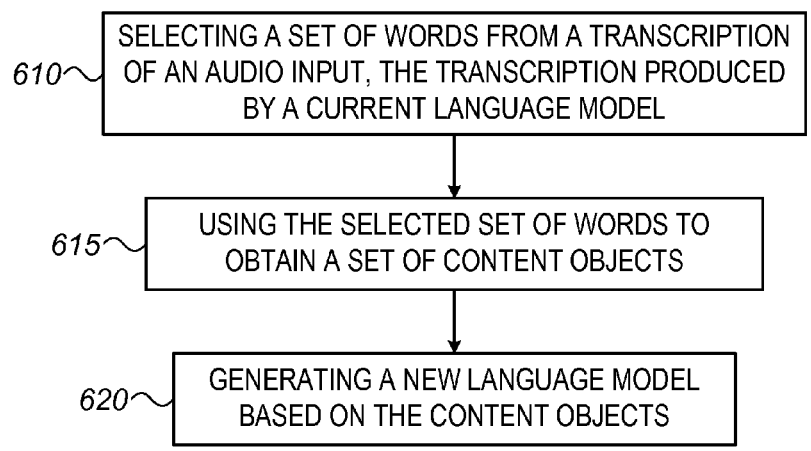
FIG. 6 shows a flowchart of a method according to an embodiment of the present invention.

Reference is made to FIG. 6 that shows a flowchart of a method according to an embodiment of the present invention. As shown by block 610, a set of words may be selected from a transcription of an audio input, the transcription produced by a current language model. For example, a set of words may be selected, by filtering unit 230, from transcriptions 227. As shown by block 615, a selected set of words may be used to obtain a set of content objects. For example, using a set of selected set of words in verified transcriptions 231, content objects may be found, obtained and/or retrieved as described herein. As shown by block 620, a new language model may be generated based on the content objects. For example, using words in transcriptions 231, content objects may be found and used to create, produce or train new language model 241 as described herein.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A computer-implemented method of automatically producing an improved transcription, the method comprising:
   obtaining, by a processor, an audio input, the audio input comprising a recording of audio signal;
   producing, by the processor, a first transcription of the audio input using a current language model;
   associating, by the processor, words included in the first transcription with probabilities each probability indicating for an associated word the likelihood that the word is a legitimate word;
   selecting, by the processor, a set of words from the first transcription having associated probabilities greater than a threshold;
   using, by the processor, the selected set of words to search, in at least one of: the internet and a database, for a set of additional textual objects that include at least one of the selected set of words, wherein the additional textual content objects are selected from the list consisting of: webpages, text posted in a social network, articles published on the internet and textual documents;
   using, by the processor, the additional textual objects to train a new language model;
   adapting, by the processor, the current language model based on the new language model to produce an improved adapted language model; and
   producing, by the processor, a second transcription of the audio input using the adapted language model.

2. The method of claim 1, comprising:
   comparing performance of the current language model with performance of the adapted language model; and
   using the adapted language model for decoding audio content if performance of the adapted language model is better than a performance of the current language model.

3. The method of claim 1, comprising performing unsupervised testing, wherein unsupervised testing includes validating that the adapted language model is better than the current language model without any intervention or effort by a human.

4. A computer-implemented method of automatically producing an improved transcription of an audio input, the method comprising:
- using, by a speech engine, a first language model to decode an input audio recording to produce a first transcription;
- associating words included in the first transcription with probabilities each probability indicating for an associated word the likelihood that the word is a legitimate word;
- selecting a set of words included in the first transcription having associated probabilities greater than a threshold;
- using the set of words to search, in at least one of: the internet and a database, for a set of additional textual content objects that include at least one of the selected set of words, wherein the additional textual content objects are selected from the list consisting of: webpages, text posted in a social network, articles published on the internet and textual documents;
- using the additional set of textual content objects to train a second language model;
- adapting the first language model based on the second language model to produce an improved adapted language model; and
- producing a second transcription of the audio input, by a speech engine, using the adapted language model.

5. The method of claim 4, comprising:
- if a performance of the speech engine, when using the second language model, is better than a performance of the speech engine when using the first language model, then configuring the speech engine to use the adapted language model.

6. The method of claim 4, comprising validating that the adapted language model is better than the first language model without any intervention or effort by a human.

7. The method of claim 4, comprising including words in the set of words based on a threshold probability.

8. A system for automatically producing an improved transcription, the system comprising:
memory; and
a processor configured to:
- obtain an audio input, the audio input comprising a recording of audio signal;
- produce a first transcription of the audio input using a current language model;
- associate words included in the first transcription with probabilities each probability indicating for an associated word the likelihood that the word is a legitimate word;
- select a set of words from the first transcription having associated probabilities greater than a threshold;
- use the selected set of words to search, in at least one of: the internet and a database, for a set of additional textual objects that include at least one of the selected set of words, wherein the additional textual content objects are selected from the list consisting of: webpages, text posted in a social network, articles published on the internet and textual documents;
- train a new language model based on the additional textual objects;
- adapt the current language model based on the new language model to produce an improved adapted language model; and
- produce a second transcription of the audio input using the adapted language model.

9. The system of claim 8, wherein the processor is configured to compare a performance of the current language model with a performance of the adapted language model, and, use the adapted language model for decoding audio content if a performance of the adapted language model is better than a performance of the current language model.

10. The system of claim 8, wherein the processor is configured to validate that the adapted language model is better than the current language model without any intervention or effort by a human.

* * * * *